United States Patent
Vallée et al.

(10) Patent No.: US 11,481,703 B1
(45) Date of Patent: Oct. 25, 2022

(54) SYSTEM AND METHOD OF AN ATTRIBUTE-VALUE COMBINATION AND ASSORTMENT PLANNER

(71) Applicant: JDA Software Group, Inc., Scottsdale, AZ (US)

(72) Inventors: Jonathan Vallée, Laval (CA); Marie-Claude Côté, Montréal (CA)

(73) Assignee: Blue Yonder Group, Inc., Scottsdale, AZ (US)

( * ) Notice: Subject to any disclaimer, the term of this patent is extended or adjusted under 35 U.S.C. 154(b) by 668 days.

(21) Appl. No.: 14/877,526

(22) Filed: Oct. 7, 2015

Related U.S. Application Data

(60) Provisional application No. 62/088,903, filed on Dec. 8, 2014.

(51) Int. Cl.
*G06Q 10/06* (2012.01)

(52) U.S. Cl.
CPC .............. *G06Q 10/06313* (2013.01)

(58) Field of Classification Search
CPC ................................. G06Q 10/06313
See application file for complete search history.

(56) References Cited

U.S. PATENT DOCUMENTS

| | | | | |
|---|---|---|---|---|
| 6,173,280 B1* | 1/2001 | Ramkumar | ....... | G06F 17/30539 707/999.006 |
| 2010/0228604 A1* | 9/2010 | Desai | ..................... | G06Q 30/02 705/7.31 |

OTHER PUBLICATIONS

Hoch et al., The Variety of an Assortment, Marketing Science, vol. 18, No. 4, 1999 (Year: 1999).*
KÖk et al., Assortment Planning: Review of Literature and Industry Practice, Retail Supply Chain Management, 2009 (Year: 2009).*
Dhar et al., Effective category management depends on the role of the category, Journal of Retailing 77 (2001) pp. 165-184. (Year: 2001).*
Agrawal, Rakesh, and Ramakrishnan Srikant. (Sep. 1994). Fast algorithms for mining association rules. In Proc. 20th int. conf. VLDB (vol. 1215, pp. 487-499).

* cited by examiner

*Primary Examiner* — Nadja N Chong Cruz
(74) *Attorney, Agent, or Firm* — Spencer Fane LLP; Steven J. Laureanti

(57) ABSTRACT

A system and method are disclosed for generating an assortment plan by an assortment planner. The assortment planner stores value metrics for two or more products, each of the products including two or more of attributes. The assortment planner also analyzes the two or more attributes, by generating attribute values for each of the two or more attributes and communicates the attribute values for each of the two or more attributes to a planning engine. The assortment planner also further constructs a product attributes table and a value metrics table, duplicates the attribute values to generate a merged product attributes table including a number of duplicates of the attribute values and generates a binary value table for each of the attribute values, one or more itemsets, and an assortment of products based, at least in part, on the one or more itemsets. Other embodiments are also disclosed.

17 Claims, 3 Drawing Sheets

SYSTEM AND METHOD OF AN ATTRIBUTE-VALUE COMBINATION AND ASSORTMENT PLANNER

CROSS-REFERENCE TO RELATED APPLICATIONS

The present disclosure is related to that disclosed in the U.S. Provisional Application No. 62/088,903, filed Dec. 8, 2014, entitled "A System and Method of an Attribute-Value Combination and Assortment Planner." U.S. Provisional Application No. 62/088,903 is assigned to the assignee of the present application. The subject matter disclosed in U.S. Provisional Application No. 62/088,903 is hereby incorporated by reference into the present disclosure as if fully set forth herein. The present invention hereby claims priority under 35 U.S.C. § 119(e) to U.S. Provisional Application No. 62/088,903.

TECHNICAL FIELD

The disclosure relates generally to retail assortment and more particularly to a system and method of an attribute-value combination analysis and assortment planner.

BACKGROUND

Traditional product assortment planning generally consists of a person, termed a "planner," deciding what products a business will carry for a given sales period in response to consumer demand. These persons generally decide what products to carry based only on their feelings and rudimentary business intelligence. Such decisions may include identifying and relying on the qualities or characteristics of products that the planner believes the consumers are demanding.

In the fashion industry, for example, where a product is clothing, a product may be defined by characteristics of clothing, such as color, fabric, sleeve length and so on. In this case, the planner will have to select what clothing will be selected for a new assortment. In this regard, the planner identifies the combination of clothing characteristics that worked well in the past based on some metric the planner selects. The planner may then select from a catalog or design a new product having the characteristics that the planner deems important to add to the new assortment.

However, determining what combination of qualities or characteristics satisfies demand is difficult and compounded by the enormous number of products and attributes. Even when a planner has access to historical data, the combination of products and attributes is impossible for a planner to accurately parse into a set of combinations that would satisfy consumer demand. Therefore, previous solutions to plan product assortments have proven inadequate.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
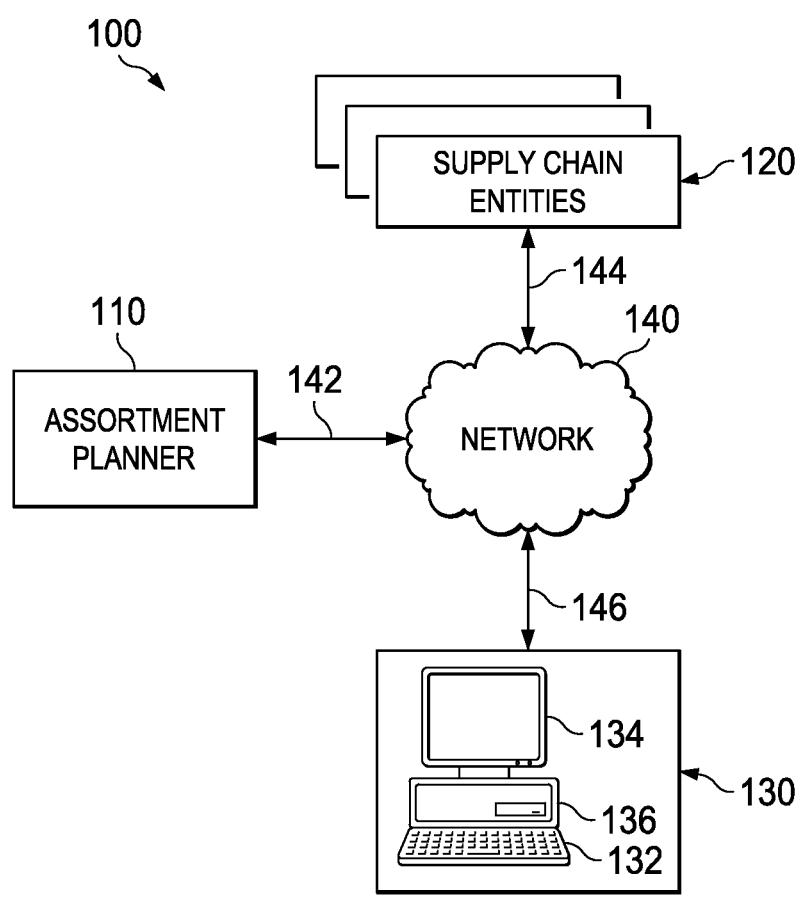
FIG. 1 illustrates an exemplary supply chain system according to a first embodiment.

Systems and methods for product assortment planning and applications of the invention presented herein are described below in the drawings and detailed description of the invention. Unless specifically noted, it is intended that the words and phrases herein be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that embodiments of the present invention may be practiced without these specific details. In other instances, known structures and devices are shown and/or discussed more generally in order to avoid obscuring the invention. In many cases, a description of the operation is sufficient to enable one of ordinary skill in the applicable art to implement the various forms of the invention. It should be appreciated that there are many different and alternative configurations, devices and technologies to which the disclosed inventions may be applied. The full scope of the present disclosure is not limited to the examples described below.

As described more fully below, aspects of the following disclosure relate to assortment planning in retailers. Attribute-value combination analysis plays a crucial role in product assortment decisions such as product removal or product addition and/or an introduction of a new product assortment. According to some embodiments, an attribute-value combination analysis may entail a transactional approach to product attributes and value metrics for products in an assortment. In addition, or as an alternative, the following disclosure relates to one or more aspects of assortment planning in a supply chain network. According to one aspect, an assortment of products is determined to generate orders for an attribute-value combination having the highest value according to a value metric, send a stop order for attribute-value combinations having the lowest value according to a value metric, and/or generate an assortment plan incorporating information regarding sales, profitability, or the like for any one or more attribute-value combinations and to any of the entities in a supply chain network. According to another aspect, a purchase order may be communicated to one or more suppliers, manufactures, or distribution centers of a supply chain network, which, in turn, manufactures and/or ships the products in the assortment and then ships the products to the retailer, where the products are allocated to, for example, individual retail stores.

FIG. 1 illustrates an exemplary system 100 according to a first embodiment. System 100 comprises an assortment planner 110, one or more supply chain entities 120, computers 130, a network 140, and communication links 142, 144, and 146. Although a single assortment planner 110, one or more supply chain entities 120, a single computer, and a single network 140, are shown and described; embodiments contemplate any number of assortment planners 110, any number of supply chain entities 120, any number of computers 130, or any number of networks 140, according to particular needs.

System 100 may operate on one or more computers 130 that are integral to or separate from the hardware and/or software that support assortment planner 110 and one or more supply chain entities 120. Computers 130 may include any suitable input device 132, such as a keypad, mouse, touch screen, microphone, or other device to input information. An output device 134 may convey information associated with the operation of system 100, including digital or analog data, visual information, or audio information. Computers 130 may include fixed or removable computer-readable storage media, including a non-transitory computer readable storage medium, magnetic computer disks, flash drives, CD-ROM, in-memory device or other suitable media to receive output from and provide input to system 100. Computers 130 may include one or more processors 136 and associated memory to execute instructions and manipulate information according to the operation of system 100.

Although a single computer 130 is shown in FIG. 1, assortment planner 110 and one or more supply chain entities 120 may each operate on separate computers 130 or may operate on one or more shared computers 130. Each of the one or more computers 130 may be a work station, personal computer (PC), network computer, tablet, personal digital assistant (PDA), cell phone, telephone, wireless data port, or any other suitable computing device. In an embodiment, one or more users may be associated with assortment planner 110. These one or more users may include, for example, a "manager" or a "planner" handling retail process management, retail product assortment and/or one or more related tasks within system 100. In addition, or as an alternative, these one or more users within system 100 may include, for example, one or more computers 130 programmed to autonomously handle, among other things, attribute-value combination analysis of retail process management and product assortment and/or one or more related tasks within system 100.

In one embodiment, one or more supply chain entities 120 represent one or more supply chain networks including one or more entities 120, such as, for example suppliers, manufacturers, distribution centers, retailers, stores, online stores, and/or customers. A supplier may be any suitable entity that offers to sell or otherwise provides one or more items (i.e., materials, components or products) to one or more manufacturers. Items may comprise, for example, textiles, apparel, clothing, accessories, merchandise, products, parts or supplies used to generate merchandise or products. An item may comprise a part of the product, or an item may comprise a supply that is used to manufacture the merchandise or product, but does not become a part of the merchandise or product, for example, a tool, energy, or resource. In addition, or as an alternative, each of the one or more items may be represented in one or more supply chain networks by an identifier, including, for example, Stock-Keeping Unit (SKU) or Universal Product Code (UPC) information.

A manufacturer may be any suitable entity 120 that manufactures at least one product. A manufacturer may use one or more items during the manufacturing process to produce any manufactured, fabricated, assembled, or otherwise processed item, material, component, good, merchandise or product. In one embodiment, a product represents an item ready to be supplied to, for example, another supply chain entity 120 in one or more supply chain networks, such as a supplier, an item that needs further processing, or any other item and may be defined by a set of attributes. A manufacturer may, for example, produce and sell a product to a supplier, another manufacturer, a distribution center, a retailer, a customer, or any other suitable person or entity 120. A distribution center may be any suitable entity 120 that offers to sell or otherwise distributes at least one product to one or more other distribution centers, retailers and/or customers. A retailer may be any suitable entity 120, such as a store or online store that obtains one or more products to sell to one or more customers.

Although one or more supply chain entities 120 are shown and described as separate and distinct entities 120, the same entity 120 may simultaneously act as any one of the one or more supply chain entities 120. For example, one or more supply chain entities 120 acting as a manufacturer could produce a product, and the same entity 120 could act as a supplier to supply a product to another supply chain entity 120. Although one example of a supply chain network is shown and described, embodiments contemplate any operational environment and/or supply chain network, without departing from the scope of the present invention.

In one embodiment, assortment planner 110 is coupled with network 140 using communications link 142, which may be any wireline, wireless, or other link suitable to support data communications between assortment planner 110 and network 140 during operation of system 100. One or more supply chain entities 120 are coupled with network 140 using communications link 144, which may be any wireline, wireless, or other link suitable to support data communications between one or more supply chain entities 120 and network 140 during operation of system 100. Computers 130 are coupled with network 140 using communications link 146, which may be any wireline, wireless, or other link suitable to support data communications between computers 130 and network 140 during operation of system 100.

Although communication links 142, 144, and 146 are shown as generally coupling assortment planner 110, one or more supply chain entities 120, and computers 130 with network 140, assortment planner 110, one or more supply chain entities 120, and computers 130 may communicate directly with assortment planner 110, one or more supply chain entities 120, and/or computers 130, according to particular needs.

In another embodiment, network 140 includes the Internet and any appropriate local area networks (LANs), metropolitan area networks (MANs), or wide area networks (WANs) coupling assortment planner 110, one or more supply chain entities 120, and computers 130. For example, data may be maintained by assortment planner 110 at one or more locations external to assortment planner 110 and one or more supply chain entities 120 and made available to one or more associated entities or users of one or more supply chain entities 120 using network 140 or in any other appropriate manner. Those skilled in the art will recognize that the complete structure and operation of the communication network and other components within system 100 are not depicted or described. Embodiments may be employed in conjunction with known communications networks and other components.

In accordance with the principles of embodiments described herein, assortment planner 110 analyzes one or more attribute-value combinations to determine which attribute combinations correlate with one or more value metrics. Based on the attribute-value combination analysis, assortment planner 110 generates an assortment of products for one or more retailers of one or more supply chain entities 120. For example, a product may be defined by a set of attributes, which is a feature of the product or a class of features of the product. In addition, or as an alternative, attributes may be organized in a hierarchical manner such as classes, subclasses, categories, subcategories, departments, or the like. As an example only and not by way of limitation, in the clothing retail industry, an attribute may be, for example, color, fabric type, design patterns, sleeve length, segmentation (such as fashion, basic, or fashion-basic), end use, profiles, seasonality, and Good-Better-Best (GBB).

Each attribute for a product comprises an attribute value, which indicates the value of the attribute. For example, attribute values for the attribute "color" may include red, blue, black, green, yellow, or the like. Attribute values for the attribute "fabric type" may include cotton, polyester, poly-blend, wool, leather, or the like. Attribute values for the attribute "design patterns" may include stripes, plain, check, plaid, or the like. Attribute values for the attribute "end use" may include casual, dressed, or the like. Attribute values for the attribute "profiles" may include blocks, ranges, and the like. Attribute values for the attribute "seasonality" may include a value indicating if the product will be sold throughout the year or only during one or more fashion seasons. An attribute value for the attribute "GBB" may include good, better, best, or the corresponding price points or specifications for items representing good, better, best, in a product line (e.g. $19.99, $29.99, and $49.99). Although exemplary attribute values are described herein; embodiments contemplate any attribute values, according to particular industries or needs.

Figure 2:
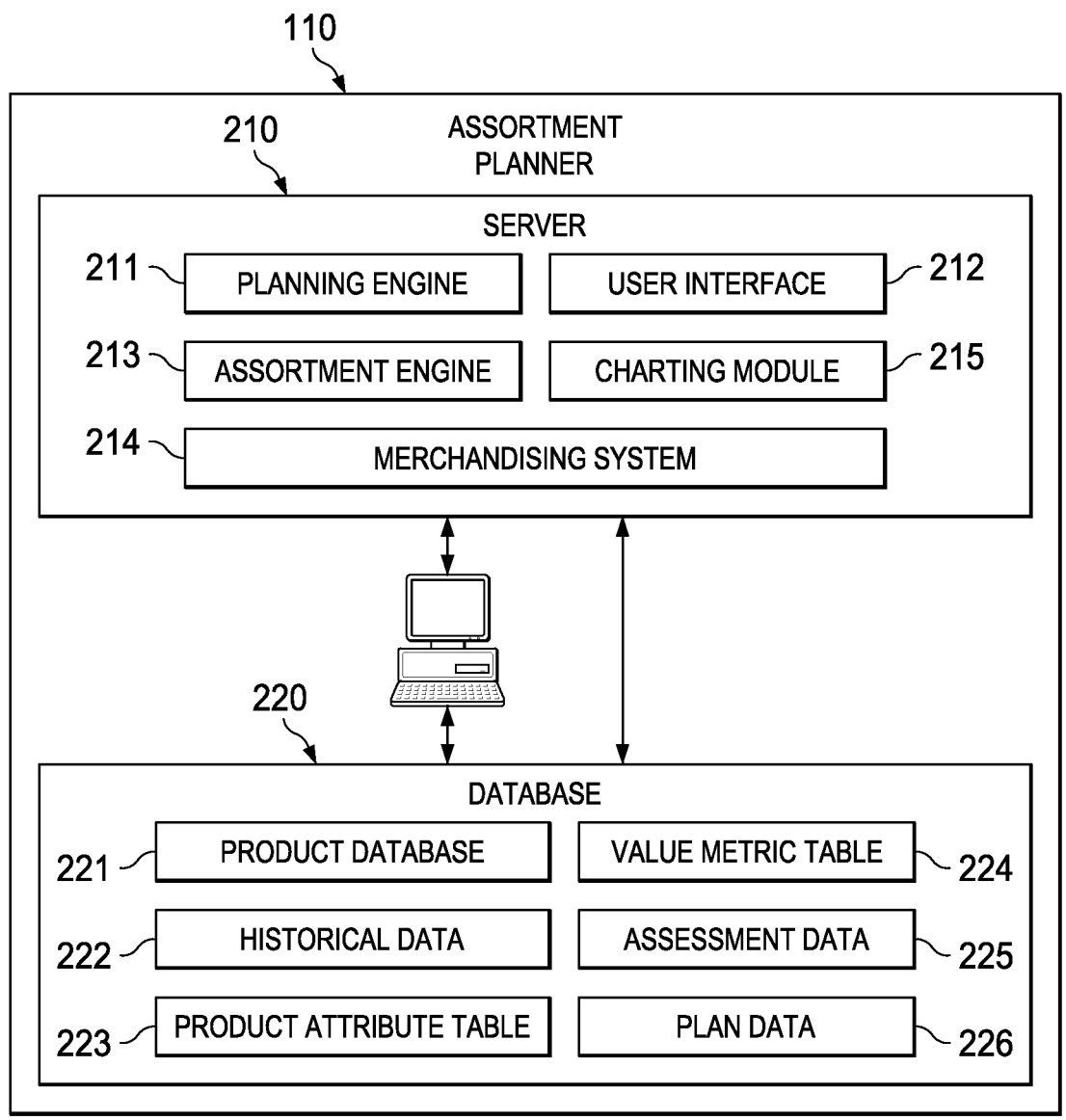
FIG. 2 illustrates the assortment planner of FIG. 1 in greater detail in accordance with the first embodiment.

FIG. 2 illustrates assortment planner 110 of FIG. 1 in greater detail, in accordance with the first embodiment. As discussed above, assortment planner 110 comprises one or more computers at one or more locations including associated input devices, output devices, non-transitory computer-readable storage media, processors, memory, or other components for receiving, processing, storing, and communicating information according to the operation of system 100.

As discussed in more detail below, assortment planner 110 comprises one or more computers, servers 210, and databases 220. Although assortment planner 110 is shown as comprising a single computer, server 210 and database 220; embodiments contemplate any suitable number of computers, servers or databases internal to or externally coupled with assortment planner 110. In addition, or as an alternative, assortment planner 110 may be located internal to one or more retailers of one or more supply chain entities 120. In other embodiments, assortment planner 110 may be located external to one or more retailers of one or more supply chain entities 120 and may be located in, for example, a corporate retailer or a regional retailer of the one or more retailers, according to particular needs.

Server 210 comprises planning engine 211, user interface 212, assortment engine 213, merchandising system 214, and charting module 215. Although a particular configuration of server 210 is shown and described; embodiments contemplate any suitable number or combination of planning engines, user interfaces, assortment engines, merchandising systems, and charting modules, located at one or more locations, local to, or remote from, assortment planner 110 according to particular needs. Furthermore, planning engine 211, user interface 212, assortment engine 213, merchandising system 214, and charting module 215, may be located at one or more locations, local to, or remote from, assortment planner 110 such as on multiple servers or computers 130 at any location in system 100.

According to one embodiment, planning engine 211 generates a product assortment for including or excluding an assortment of products according to attribute-value combinations based on, for example, an attribute-value combination analysis. Planning engine 211 may, for example, based on the generated product assortment, rule or forecast threshold, determine an assortment of products to generate orders for an attribute-value combination having a highest value according to a value metric, send a stop order for attribute-value combinations having the lowest values according to a value metric, and/or generate an assortment plan incorporating information regarding sales, profitability, or the like for any one or more attribute-value combinations and to any of the one or more supply chain entities 120. According to some embodiments, planning engine 211 receives attribute and attribute values from merchandising system 214 and/or product database 221 of database 220. Based on the information received from merchandising system 214 and/or product database 221; planning engine 211 generates and stores product attributes table 223 in database 220.

In addition, or as an alternative, in connection with the products stored in product attributes table 223, planning engine 211 generates a value metrics table 224 based on a value metric stored in historical data 222. Based on product attributes table 223 and value metrics table 224, planning engine 211 performs an attribute-value combination analysis to use in determining various product assortments. In one embodiment, planning engine 211 generates one or more itemsets comprising attribute-value combinations of various sizes, wherein the quantity represents the number of attribute values in the itemset. Based on the itemsets generated by planning engine 211, assortment planner 110 uses assortment engine 213 to generate a new assortment of products by determining which itemsets corresponds to attribute-value combinations and meet, for example, a minimal support value in addition to tactics, rules, business intelligence, and historical data.

User interface 212 generates an interface (including a graphical user interface) for receiving one or more input parameters and generating or displaying one or more resultant itemsets from the attribute-value combination analysis. Merchandising system 214 stores product attributes and product attribute values in product database 221 of database 220. Assortment planner 110 uses merchandising system 214 to generate product combinations, place product orders at one or more manufacturers and/or distribution centers, initiate manufacturing of the products at one or more supply chain entities 120, determine products to be carried at one or more retailers, or the like. According to some embodiments, merchandising system 214 comprises a Product Information Management System (PIMS), and is located at one or more supply chain entities 120.

Charting module 215 generates charts, graphs, and plots that illustrate how sales and/or profitability relate to products including any of the one or more attribute-value combinations. For example, user interface 212 of assortment planner 110 provides a graphical user interface and comprises one or more product assortment-value visualizers. According to some embodiments, product-assortment visualizers comprise charts, graphs, and plots, which display various itemsets, value metrics, filtered on different dimensions such as, consumer segments, time-periods, product types, stores, channels, departments, seasons, and/or attributes. Charting module 215 and user interface 212 will be discussed in more detail in connection with FIG. 3.

Database 220 of assortment planner 110 comprises product database 221, historical data 222, product attributes table 223, assessment data 225, and plan data 226. Although, database 220 is shown and described as comprising a product database 221, historical data 222, product attributes table 223, assessment data 225, and plan data 226, embodiments contemplate any suitable number or combination of these, located at one or more locations, local to, or remote from, assortment planner 110 according to particular needs.

Product database 221 may comprise any data structure having products identified by, for example, a Product Identification (product ID) (such as a Stock Keeping Unit (SKU), Universal Product Code (UPC) or the like) and one or more attributes and attribute values associated with the product ID. Historical data 222 may comprise data relating to value metrics associated with the product ID, including, for example, geographical regions, store locations, time-periods, seasonality, or other types of granular dimensions. In addition, or as an alternative, historical data 222 may be represented by, for example, sales per week, sales per week per location, and the like.

Product attributes table 223 may comprise a subset of product database 221 and may include the product ID, values, and value attributes of the products to be analyzed by the attribute-value combination analysis. Assessment data 225 may comprise the results of the attribute-value combination analysis by a value metric, such as, for example, sales associated with one or more itemsets, profits associated with an itemset and the like. In addition, or as an alternative, assessment data 225 may comprises a ranking of itemsets according to the support each itemset receives by the attribute-value combination analysis or any other score, ranking, or the like, according to particular needs. Plan data 226 may comprise a preferred assortment generated by the assortment planner 110 in response to the attribute-value combination analysis. According to some embodiments, assortment planner 110, in response to the attribute-value combination analysis, determines one or more itemsets to be preferred based on one or more value metrics. In response, assortment planner 110 generates an assortment plan comprising a product assortment that incorporates the preferred itemsets. According to other embodiments, the assortment plan will lead to product orders, manufacturing orders, or other instructions communicated to one or more supply chain entities 120 to initiate the assortment plan according to the attribute-value combination analysis.

In order to explain the operation of assortment planner 110, an example is now given. In the following example, planning engine 211 determines an assortment selection of clothing for a retailer of the one or more supply chain entities 120, for example, the fall fashion season, by performing an attribute-value combination analysis of clothing products with, for example, high historical sales. Based on the attribute-value combination analysis, itemsets are determined that correlate with, for example, high sales. Assortment planner 110 communicates a purchase order to one or more suppliers, manufactures, or distribution centers of one or more supply chain entities 120, which, in turn, manufactures and/or ships the products in the assortment and then ships the products to the retailer, where the products are allocated to, for example, individual retail stores. In addition, or as an alternative, products may be shipped to one or more retailer distribution centers, where the products are allocated to, for example, regional retail stores or online sales. Although, a particular assortment selection is shown and described; embodiments contemplate any type of assortment selection, according to particular needs.

In another example, assortment engine 213 of assortment planner 110 may receive a tactic constraining a product assortment to be 10% with the product attribute combination of a color of blue and a fabric of cotton. In order to select attribute-values for the product assortment or attribute-values in addition to tactics or predetermined attribute-values, planning engine 211 generates itemsets, including itemsets comprising the color blue and a cotton fabric. After planning engine 211 runs the attribute-value combination analysis, planning engine 211 generates one or more itemsets comprising the product attribute combination of a blue color and a cotton fabric with additional attribute values that assortment planner 110 will use to generate a product assortment and thereby place a product order. For example, the attribute-value combination may include itemsets of "color=blue and fabric=cotton," or "brand=Ralph Lauren™ and color=white and fabric=synthetic." Although, a particular tactic is described; embodiments contemplate a tactic comprising any constraint, such as, for example, a percentage of an assortment that comprises a predetermined product attribute value, a budget of total price, a price for a particular clothing product, or the like.

Figure 3:
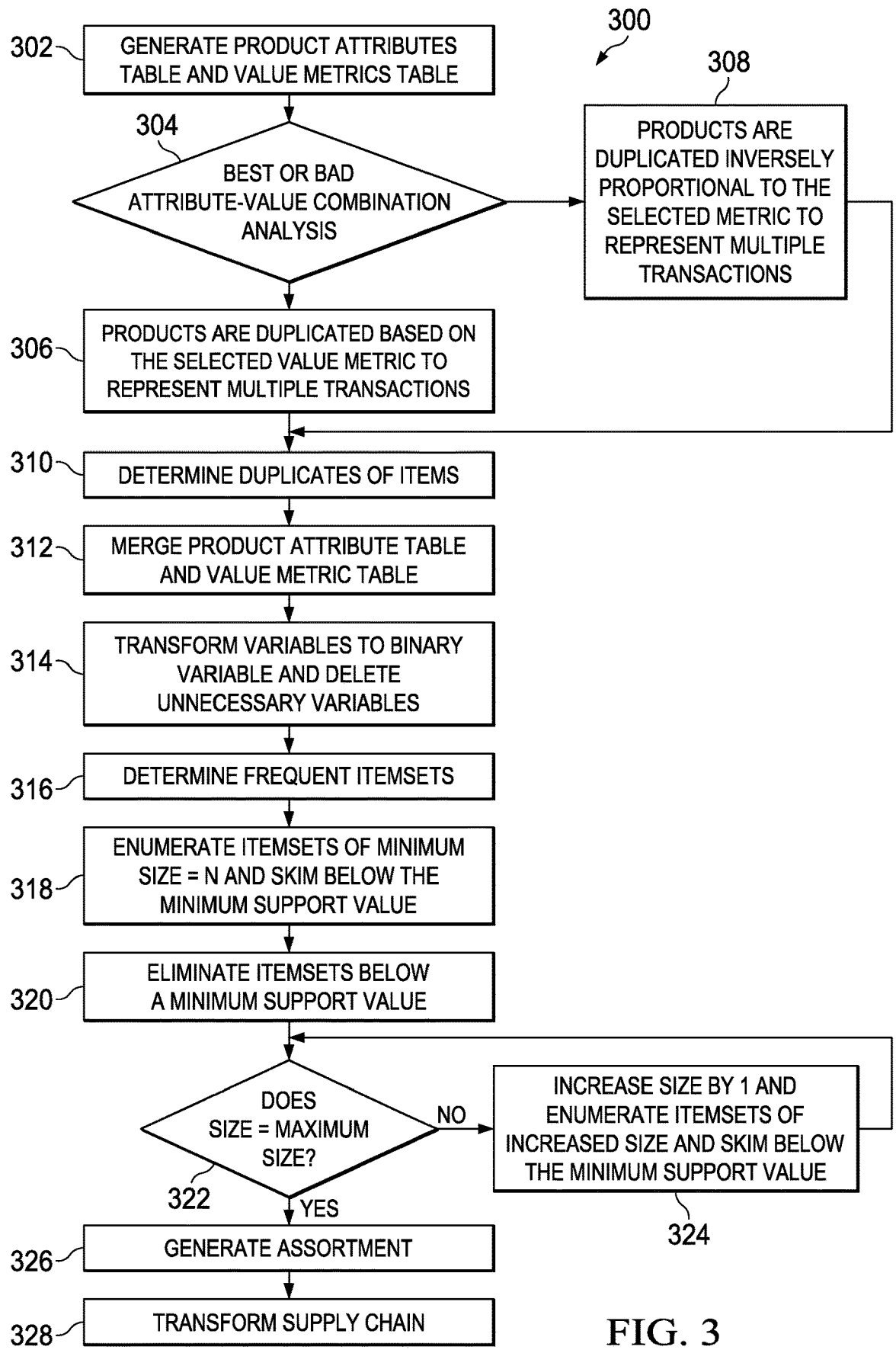
FIG. 3 illustrates an exemplary method of performing an attribute-value combination analysis.

FIG. 3 illustrates method 300 of performing an attribute-value combination analysis according to an embodiment. The process of attribute-value combination analysis proceeds by one or more steps, which although described in a particular order may be performed in one or more permutations, according to particular needs. Method 300 begins at activity 302 where planning engine 211 generates a transactional product attributes table 223 and value metrics table 224 for products based on data in product database 221 and historical data 222.

According to an embodiment, product attributes table 223, comprises product identifiers and attribute values, which are received from product database 221. A product identifier identifies the product and a product is defined by a set of attributes, which is a feature of the product or a class of features of the product. In addition, or as an alternative, attributes may be organized in a hierarchical manner such as classes, subclasses, categories, subcategories, departments, or the like. As an example only and not by way of limitation, in the clothing retail industry, an attribute may be, for example, color, fabric type, design patterns, sleeve length, segmentation (such as fashion, basic, or fashion-basic), end use, profiles, seasonality, and Good-Better-Best (GBB). Each attribute for a product comprises an attribute value, which indicates the value of the attribute. As an example only and not by way of limitation, attribute values for the attribute "color" may include red, blue, black, green, yellow, or the like. Attribute values for the attribute "fabric type" may include cotton, polyester, poly-blend, wool, leather, or the like. Attribute values for the attribute "design patterns" may include stripes, plain, check, plaid, or the like. Attribute values for the attribute "end use" may include casual, dressed, or the like. Attribute values for the attribute "profiles" may include blocks, ranges, and the like. Attribute values for the attribute "seasonality" may include a value indicating if the product will be sold throughout the year or only during one or more fashion seasons. An attribute value for the attribute "GBB" may include good, better, best, or the corresponding price points or specifications for products representing good, better, best, in a product line (e.g. $19.99, $29.99, and $49.99). Although exemplary attributes and attribute values are shown and described; embodiments contemplate any suitable number or combination of attributes and attribute values, according to particular needs.

In addition, or as an alternative, product attributes table 223 may also comprise a time dimension, a location dimension and/or a customer segmentation dimension. A time dimension represents a time of year or a seasonal interval that permits assortment planner 110 to sort the attribute-value combination analysis results by a seasonal interval and/or perform the attribute-value combination analysis when products may perform differently depending on a month or season, such as, for example, a holiday, spring, summer, fall, winter or the like. A location dimension represents a geographical area that permits assortment planner 110 to sort the attribute-value combination analysis results by geographical area and/or perform the attribute-value combination analysis on only a particular geographic area, such as, for example, a store, city, state, region, country or the like. A customer segmentation dimension represents an identified customer base that exhibits similar consumer behavior that permits assortment planner 110 to sort the attribute-value combination analysis results by customer segment and/or preform the attribute-value combination analysis on only a particular customer segment, such as, for example, gender, age, or the like. In this way, itemsets can be determined, which appeal to particular times, geographic regions and/or customer segments. Although, exemplary dimensions are described; embodiments contemplate any suitable type, number or combination of dimensions, according to particular needs.

To further explain the method of performing an attribute-value combination analysis, as example is now given. In the following example, planning engine 211 generates product attributes table 223 from product database 221 for a clothing retailer of one or more supply chain entities 120. In addition, as discussed above, a clothing retailer may be a corporate retailer or a regional retailer of the one or more retailers of one or more supply chain entities 120. In addition, or as an alternative, although a retailer is described as a clothing retailer having attributes and attribute values associated with the clothing retailer; embodiments contemplate any type of merchandiser, apparel retailer, clothing retailer, fashion retailer, jewelry retailer, or other retailer having like attribute and attribute values, according to particular needs.

Continuing with this example, and not by way of limitation, Table 1 illustrates product attributes table 223, generated by planning engine 211 and including four (4) products having attributes including one product per line:

TABLE 1

| ID | Color | Size | Style |
|----|-------|------|-------|
| 1 | Blue | S | Fashion |
| 2 | Yellow | M | Fashion |
| 3 | Blue | S | Casual |
| 4 | Red | L | Fashion |

Although, an exemplary set of product identifiers and attributes' values are shown and described as comprising particular number of products and attribute values; embodiments contemplate any suitable number or combination of these, according to particular needs. Continuing with this example, planning engine 211 next generates value metrics table 224, comprising value metrics for each product identifier, which are received from historical data 222. As discussed above, a value metric may be any value metric, including sales, sales of units, profits, promotional sales units, promotional sale dollars, and/or number of returns. Continuing with this example, and not by way of limitation, Table 2 illustrates value metrics table 224, including a value metrics for each product identifier, in this example, sales:

TABLE 2

| ID | Sales |
|----|-------|
| 1 | 50 |
| 2 | 250 |

TABLE 2-continued

| ID | Sales |
|----|-------|
| 3 | 30 |
| 4 | 20 |

Although, an exemplary value metrics table 224 is shown and described comprising a value metric of high historical sales for each product identifier; embodiments contemplate any suitable number of value metrics, such as for example, sales, sales of units, profits, promotional sales units, promotional sale dollars, number of returns, or like metrics, according to particular needs. In addition, as shown above, TABLES 1 and 2 each comprise four products, having product identifier (ID) 1, 2, 3, and 4. Each product has three attributes, i.e., color, size, and style. In this example, the attribute values for color are blue, yellow, and red, the attribute values for size are S, M, and L and the attribute values for style are fashion and casual. In addition, each product also has an associated sales data from, for example, historical data 222. That is, Product 1 has 50 sales, Product 2 has 250 sales, Product 3 has 30 sales, and Product 4 has 20 sales. Although represented as a simple sales figure, embodiments contemplate also representing the value metrics as a sales over time dimension representing sales per some unit of time, such as, for example, sales per week, per month, per season, etc. Additionally, although this example shows only four products, three attributes, and one value metric, embodiments contemplate any number of products, attributes, and value metrics, according to particular needs. However, for simplicity and clarity, only a limited number of attributes are shown and described, however, a typical embodiment may comprise at least 20 attributes and particularly more than 100 attributes being evaluated in a single attribute-value combination analysis.

At activity 304, planning engine 211 determines whether to perform a best attribute-value combination analysis or a bad attribute-value combination analysis. If a best attribute-value combination analysis is determined, assortment planner 110 continues to activity 306. If a bad attribute-value combination analysis is determined, assortment planner 110 continues to activity 308. At activity 306, and to perform the best attribute-value combination analysis, assortment planner 110 duplicates products from product attributes table 223 of Table 1 based on the selected value metric, in this example, sales from Table 2 to represent multiple transactions. The best attribute-value combination analysis result highlights what combination of attributes sell well together and gives insights relative to what combination of attributes would be desirable to include in the product assortment based on the duplication of products according to value metrics, in this example, sales.

At activity 308, and to perform the bad attribute-value combination analysis, assortment planner 110 duplicates products from product attributes table 223 of Table 1 inversely proportional to the selected value metric, in this example, sales from Table 2 to represent multiple transactions. The bad attribute-value combination analysis result highlights what combination of attributes do not sell well together and gives insights relative to what combination of attributes would not be desirable to include in the product assortment based on the inverse duplication of products according to value metrics, in this example, sales. The data transformation of activities 306 and 308 provide the ability to consider an aggregated database structured as a transactional database and to which method 300 can be directly applied. The result is a set of attribute-value combinations that are highly represented in the value metric, in this example, sales. These combinations represent insights for assortment planner 110 as to what combination of attribute-value combinations might be desirable or not desirable to include in the product assortment.

Continuing with this example, at activity 310, planning engine 211 determines how many duplicates of the one or more products is needed according to equation (1):

$$f(x) = \text{ceiling}\left(\frac{x_i - \min(x)}{\max(x) - \min(x)} \cdot k\right) \quad (1)$$

wherein: x is a vector of the selected value metric (ex. sales) aggregated with a range of dates by product; $x_i$ is the selected value metric (ex. sales) for the product to duplicate; and k is the maximum multiplication parameter. In addition, or as an alternative, the number of duplicates is equal to the closest following integer.

In addition, according to equation (1), a product with the best performance according to the value metric will be duplicated by a factor of the maximum multiplication parameter and the worst performing product will not be represented. For example, if the maximum multiplication parameter is 100 and the value metric is sales, the highest selling product will be duplicated 100 times in product attributes table 223 and other products will be duplicated proportionally to that product. Additionally, the product with the lowest sales would not be duplicated in the table.

The maximum multiplication parameter, k, is a pre-defined parameter, based on, among other things, the retailer, the industry, the type of products, the season, the location or geographical region. The higher the value of the maximum multiplication parameter k, the longer the analysis will run. According to some embodiments, k is optimized to be a number representative of the industry or types of products included in the table. In addition, as discussed above, equation (1) is applied to any value metric, including sales, sales of units, profits, promotional sales units, promotional sale dollars, and/or number of returns. Additionally, the value metrics may be associated with one or more time dimensions, location dimensions and/or customer segments, according to particular needs.

Continuing with this example, equation (1) is applied to the product attributes table 223 and value metrics table 224 with a maximum multiplication parameter. In this example, equation (1) is applied to the data presented in Tables 1 and 2 with a maximum multiplication parameter of 3:

$$\text{Multiplicator of product ID 1} = \text{ceiling}\left(\frac{50-20}{250-20} \cdot 3\right) = 1$$

$$\text{Multiplicator of product ID 2} = \text{ceiling}\left(\frac{250-20}{250-20} \cdot 3\right) = 3$$

$$\text{Multiplicator of product ID 3} = \text{ceiling}\left(\frac{30-20}{250-20} \cdot 3\right) = 1$$

$$\text{Multiplicator of product ID 4} = \text{ceiling}\left(\frac{20-20}{250-20} \cdot 3\right) = 0$$

As shown above, equation (1) is a way to proportion the product attributes based on the metrics selected. That is, in this example, product ID 1 is equal to a multiplicator of one (1) time, product ID 2 is equal to a multiplicator of three (3) times, product ID 3 is equal to a multiplicator of one (1) time and product ID 4 is equal to a multiplicator of zero (0) times. In addition, as discussed above, and for the sake of simplicity, this example uses a small k value, however, embodiments contemplate using a higher k value, such as for example, 100, 1000 or higher, according to particular needs. That is, if k is equal to 100, product ID 1 is equal to a multiplicator of fourteen (14) times, product ID 2 is equal to a multiplicator of one hundred (100) times, product ID 3 is equal to a multiplicator of five (5) times and product ID 4 is equal to a multiplicator of zero times. Likewise, if k is equal to 1000, then, product ID 1 is equal to a multiplicator of one hundred thirty one (131) times, product ID 2 is equal to a multiplicator of one thousand (1,000) times, product ID 3 is equal to a multiplicator of forty four (44) times and product ID 4 is equal to a multiplicator of zero times.

At Activity 312, planning engine 211 applies the mulitplicator of each product ID and generates a merged product attributes table which is a transactional-like database generated from product attributes table 223 and value metrics table 224, as shown in Table 3:

TABLE 3

| Color | Size | Style |
|---|---|---|
| Blue | S | Fashion |
| Yellow | M | Fashion |
| Yellow | M | Fashion |
| Yellow | M | Fashion |
| Blue | S | Casual |

As shown in the merged product attributes table of TABLE 3, the highest selling product, product ID 2 (in this example, Yellow, M and Fashion) is represented three times, product IDs 1 and 3 are proportionally represented one time each (in this example, Blue, S and Fashion and Blue, S and Casual) and the lowest selling product, product ID 4 (in this example, Red, L and Fashion), is eliminated from the database. In addition, as discussed above, although a particular value metric is shown and described in this example as sales; embodiments contemplate any value metric, such as for example, sales, sales of units, profits, promotional sales units, promotional sale dollars, number of returns, or like metrics, according to particular needs.

At Activity 314, planning engine 211 transforms the merged product attributes table of Table 3 into a binary matrix or one-hot matrix by representing each category value as a separate category and then applying a yes/no binary value (represented as 1=yes (hot) and 0=no (not hot)) for each product. That is, planning engine 211 transposes each attribute to its attribute values and then adds a binary value, which identifies which value is hot for that particular attribute. Continuing with this example yields the following binary matrix Table 4 of the merged product attributes table of Table 3:

TABLE 4

| Blue | Yellow | M | S | L | Fashion | Casual |
|---|---|---|---|---|---|---|
| 1 | 0 | 0 | 1 | 0 | 1 | 0 |
| 0 | 1 | 1 | 0 | 0 | 1 | 0 |
| 0 | 1 | 1 | 0 | 0 | 1 | 0 |
| 0 | 1 | 1 | 0 | 0 | 1 | 0 |
| 1 | 0 | 0 | 0 | 1 | 0 | 1 |

According to an embodiment, planning engine 211 removes the product ID and the value metric (i.e., in this example, number of sales) from the merged product attributes table of Table 3. That is, planning engine 211 abstracts and disregards any value metric and product ID because the construction of the merged product attributes table takes into account the value metric and the product ID is no longer of value, since the binary matrix Table 4 (i.e., one-hot matrix table) looks only at individual value attributes. In one embodiment, planning engine 211 transposes every attribute to its attribute value and then adds a binary value that indicates whether the value is hot (present) for that particular attribute.

In addition, or as an alternative, at activity 316, planning engine 211 determines frequent itemsets, such that infrequent itemsets are eliminated at each iteration. In one embodiment, method 300 uses the Apriori method to eliminate unfrequent itemsets at every iteration of the value-attribute combination analysis. In other embodiments, other methods are employed to eliminate unfrequent itemsets at every iteration of the value-attribute combination analysis. As an example only and not by way of limitation, planning engine 211 may use another method to perform a first iteration that enumerates all possible itemsets of minimum size and eliminates the ones with a support below the minimum support value. A second iteration builds itemsets of an increasing size from the remaining itemsets of the minimum size and eliminates the ones with a support below the minimum support value. The method continues increasing the size of the itemsets and evaluating minimum support until all itemsets with a size equal to the maximum size is reached and a support over the minimum support is found. The method then returns itemsets with the minimum, maximum, and/or intermediate sizes with support greater than the minimum support value.

At activity 318 and continuing with this example, planning engine 211 enumerates all itemsets of minimum size and skims (i.e. eliminates) any itemsets below the minimal support value. As discussed above, planning engine 211 generates one or more itemsets comprising attribute-value combinations of various sizes, wherein the size represents the number of attribute values in the itemset. As an example only and not by way of limitation, planning engine 211 sets the minimum size to 1 and sets the minimal support value to 50%. Although, a particular minimum size and minimal support value are shown and described; embodiments contemplate any minimum size or support value, according to particular needs. Accordingly, since in this example, the minimum size is set to 1, planning engine 211 constructs all itemsets of size 1, which are each attribute-value combination of size 1. Planning engine 211 then calculates the support value that represents the frequency of occurrence of each attribute value in the matrix divided by the total number of values in that attribute column. In other words, the minimal support value is the percentage of time that the product is found in the product attributes table, as shown in Table 5.

TABLE 5

| Itemset | Support |
| --- | --- |
| Blue | 40% |
| Yellow | 60% |
| M | 60% |
| S | 20% |
| L | 20% |
| Fashion | 80% |
| Casual | 20% |

As shown above and continuing with this example, Table 5 illustrates a list of all itemsets of size 1 of the binary matrix table of Table 4 with the percentages of support for each attribute-value. In this example, the attribute-value fashion is found 80% of the time; the attribute-values yellow and medium are found 60% of the time; the attribute-value blue is found 40% of the time; and the attribute-values small, large and casual are found 20% of the time. At activity 320 and continuing with this example, because the minimum support value is set to 50%, planning engine 211 eliminates all itemsets with support value below 50%. Therefore, based on this example only, the attribute-values yellow, medium and fashion are presented in the remaining Itemsets of size 1. In addition, or as an alternative, if the minimum support value was set to 40%, then only the attribute-values blue, yellow, medium and fashion would be presented in the remaining Itemsets of size 1. Likewise, if the minimum support value was set to 20% then the attribute-values blue, yellow, medium, small, larger, fashion and casual would be presented in the remaining Itemsets of size 1.

Returning to the example and after planning engine 211 skims (i.e., deletes or removes) all itemsets below the minimum support value, the remaining itemsets of size 1 is, shown below in Table 6:

TABLE 6

| Itemset | Support |
| --- | --- |
| Yellow | 60% |
| M | 60% |
| Fashion | 80% |

As shown in Table 6, the remaining itemsets of size 1 with at least 50% minimal support values are yellow, medium and fashion. At Activity 322, planning engine 211 determines whether the current size of the itemset is equal to the chosen maximum itemset size. If the current size is not equal to the maximum size, planning engine 211 continues to activity 324. At activity 324, planning engine 211 increases the itemset size by one and then reevaluates the minimum support value for the new size and eliminates all itemsets of increased size below the minimum support value.

As an example only and continuing with this example, the maximum size was set to 3 and the current size is 1. Planning engine 211 adds one to the itemset size 1 and generates all itemsets of size 2, which yields Table 7 of itemsets of size 2:

TABLE 7

| Itemset | Support |
| --- | --- |
| Yellow - M | 60% |
| Yellow - Fashion | 60% |
| M - Fashion | 60% |

In other words, planning engine 211 enumerates all itemsets of size 2 from the remaining itemsets of size 1, calculates the support value and skims any itemsets with a support value below the minimum value. Since, no itemsets of size 2 can be composed of products not in the remaining itemsets of size 1. Next, planning engine 211 evaluates the itemsets of size 3. From the remaining itemsets of size 2, planning engine 211 builds the itemsets of size 3, as follows:

TABLE 8

| Itemset | Support |
| --- | --- |
| Yellow - M - Fashion | 60% |

After the itemsets of size 3 is evaluated, the attribute-value combination analysis ends because there are no more possible itemsets equal to or greater than size 3 to identify. In addition, or as an alternative, in this example, the maximum size for the itemsets was set to 3, after which planning engine 211 displays the itemsets and the attribute-value combination analysis ends. Alternatively, if the maximum size of the itemsets had been set to four or greater, the attribute-value combination analysis would still end at itemset size of 3 because there are no possible itemsets greater than size 3. If the current size of the itemset is equal to the maximum size, planning engine 211 continues to activity 326. At activity 326, planning engine 211 generates the itemsets of the determined sizes with the minimum support value and displays the itemsets to user interface 212. Planning engine 211 then stores the results of the itemset of size 3, in this example, yellow, M and Fashion with support greater than the minimum support value.

At activity 328, assortment planner 110 transforms the supply chain based, at least in part, on the generated assortment plan. For example, merchandising system 214 of assortment planner 110 may place an order for one or more products to a supply chain entity 120, such as a supplier or distribution center, to order products according to the attribute-value combinations based on, for example, the attribute-value combination analysis. Likewise, merchandising system 214 of assortment planner 110 may initiate manufacturing of products at one or more supply chain entities 120 and/or determine products to be carried or products to be excluded from one or more retailers.

In addition, although FIG. 3 illustrates one embodiment of an exemplary method of performing an attribute-value combination analysis, various changes may be made to method 300 without departing from the scope of embodiments described herein.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method of assortment planning, comprising:
storing, by a computer comprising a processor and a memory associated with a retailer, value metrics for two or more products, each of the products comprising two or more of attributes;
analyzing, by a computer comprising a processor and a memory associated with a merchandising system, the two or more attributes, by generating attribute values for each of the two or more attributes;
communicating, by the computer associated with the merchandising system to the computer associated with the retailer over a communications network, the attribute values for each of the two or more attributes;
constructing, by the computer associated with the retailer, a product attributes table and a value metrics table;
duplicating, by the computer associated with the retailer, the attribute values to generate a merged product attributes table comprising a number of duplicates of the attribute values, wherein the number of duplicates is determined for each product based on a ceiling function of the value metrics for the two or more products and on a maximum multiplication parameter, the number of duplicates is further determined by:

$$f(x) = \text{ceiling}\left(\frac{x_i - \min(x)}{\max(x) - \min(x)} \cdot k\right)$$

wherein, x is a vector of the value metric aggregated with a range of dates for the two or more products, $x_i$ is the value metric for the two or more products, and k is the maximum multiplication parameter;
generating, by the computer associated with the retailer, a binary value table for each of the attribute values, one or more itemsets, and an assortment of products based on the one or more itemsets;
performing, by the computer associated with the retailer, a first iteration that enumerates all possible itemsets of minimum size and further eliminates itemsets with a support below a minimum support value to generate remaining itemsets;
performing, by the computer associated with the retailer, a second iteration on the remaining itemsets to increment a size of the remaining itemsets and further eliminate itemsets from the incremented remaining itemsets with a support below a minimum support value;
repeating, by the computer associated with the retailer, the second iteration until a stopping criteria is met resulting in generating an optimal set of itemsets indicating an optimal assortment of products; and
initiating manufacturing of the two or more products of the assortment of products at one or more supply chain entities.

2. The method of claim 1, wherein the product attributes value table comprises:
a set of the two or more products wherein each of the two or more products is identified by a product identifier and each product identifier is associated with one or more of the attribute values.

3. The method of claim 2, wherein the value metrics table comprises:
a set of the two or more products wherein each of the two or more products is identified by a product identifier and each product identifier is associated with one or more of the value metrics.

4. The method of claim 3, wherein each of the one or more itemsets comprises a combination of the attribute values, and generating one or more itemsets comprises:
enumerating, by the computer associated with the retailer, two or more itemsets of a first size, wherein the size of the itemsets represents a number of the attribute values in the combination of attribute values;
calculating, by the computer associated with the retailer, a support value for each itemset of the two or more itemsets of the first size, wherein the support value represents a frequency of occurrence of the combination of attribute values for each itemset of the two or more itemsets of the first size;

receiving, by the computer associated with the retailer, a minimal support value, wherein the minimal support value represents a minimum frequency of occurrence of the combination of attribute values; and skimming, by the computer associated with the retailer, each of the itemsets of the two or more itemsets of the first size with the support value less than the minimal support value.

5. The method of claim 4, wherein the one or more itemsets are ranked according to a value metric associated with each of the one or more itemsets.

6. The method of claim 4, further comprising:
enumerating, by the computer associated with the retailer, two or more itemsets of a second size, wherein the size of each of the itemsets of the two or more itemsets of the second size comprises a combination of attribute values greater than the combination of attribute values of each of the itemsets of the two or more itemsets of the first size.

7. A system configured to provide an assortment plan of two or more products, comprising:
a retailer comprising a computer comprising a processor and a memory and a computer comprising a processor and a memory associated with a merchandising system, the computer associated with the retailer configured to store value metrics for two or more products, each of the products comprising two or more of attributes;
the computer associated with the merchandising engine configured to:
analyze the two or more attributes, by generating attribute values for each of the two or more attributes; and
communicate the attribute values for each of the two or more attributes to the computer associated with the retailer over a communications network;
the computer associated with the retailer further configured to:
construct a product attributes table and a value metrics table;
duplicate the attribute values to generate a merged product attributes table comprising a number of duplicates of the attribute values, wherein the number of duplicates is determined for each product based on a ceiling function of the value metrics for the two or more products and on a maximum multiplication parameter, the number of duplicates is further determined by:

$$f(x) = \text{ceiling}\left(\frac{x_i - \min(x)}{\max(x) - \min(x)} \cdot k\right)$$

wherein, x is a vector of the value metric aggregated with a range of dates for the two or more products, $x_i$ is the value metric for the two or more products, and k is the maximum multiplication parameter;
generate a binary value table for each of the attribute values, one or more itemsets, and an assortment of products based, at least in part, on the one or more itemsets;
perform a first iteration that enumerates all possible itemsets of minimum size and further eliminates itemsets with a support below a minimum support value to generate remaining itemsets;
perform a second iteration on the remaining itemsets to increment a size of the remaining itemsets and further eliminate itemsets from the incremented remaining itemsets with a support below a minimum support value;
repeat the second iteration until a stopping criteria is met resulting in generating an optimal set of itemsets indicating an optimal assortment of products and one or more supply chain entities configured to initiate a manufacturing of the two or more products, based, at least in part, on the assortment of products.

8. The system of claim 6, wherein the product attributes value table comprises:
a set of the two or more products wherein each of the two or more products is identified by a product identifier and each product identifier is associated with one or more of the attribute values.

9. The system of claim 8, wherein the value metrics table comprises:
a set of the two or more products wherein each of the two or more products is identified by a product identifier and each product identifier is associated with one or more of the value metrics.

10. The system of claim 9, wherein each of the one or more itemsets comprises a combination of the attribute values, and generate one or more itemsets comprises:
enumerate two or more itemsets of a first size, wherein the size of the itemsets represents a number of the attribute values in the combination of attribute values;
calculate a support value for each itemset of the two or more itemsets of the first size, wherein the support value represents a frequency of occurrence of the combination of attribute values for each itemset of the two or more itemsets of the first size;
receive a minimal support value, wherein the minimal support value represents a minimum frequency of occurrence of the combination of attribute values; and
skim each of the itemsets of the two or more itemsets of the first size with the support value less than the minimal support value.

11. The system of claim 10, wherein the one or more itemsets are ranked according to a value metric associated with each of the one or more itemsets.

12. The system of claim 10, wherein the planning engine is further configured to:
enumerate two or more itemsets of a second size, wherein the size of each of the itemsets of the two or more itemsets of the second size comprises a combination of attribute values greater than the combination of attribute values of each of the itemsets of the two or more itemsets of the first size.

13. A non-transitory computer-readable medium embodied with software, the software when executed configured to:
generate an assortment plan of two or more products by:
storing value metrics for two or more products, each of the products comprising two or more of attributes;
analyzing the two or more attributes, by generating attribute values for each of the two or more attributes;
communicating the attribute values for each of the two or more attributes over a communications network;
constructing a product attributes table and a value metrics table;
duplicating the attribute values to generate a merged product attributes table comprising a number of duplicates of the attribute values, wherein the number of duplicates is determined for each product based on a ceiling function of the value metrics for the two or more products and on a maximum multiplication parameter, the number of duplicates is further determined by:

$$f(x) = \text{ceiling}\left(\frac{x_i - \min(x)}{\max(x) - \min(x)} \cdot k\right)$$

wherein, x is a vector of the value metric aggregated with a range of dates for the two or more products, $x_i$ is the value metric for the two or more products, and k is the maximum multiplication parameter;

generating a binary value table for each of the attribute values, one or more itemsets, and an assortment of products based, at least in part, on the one or more itemsets;

performing a first iteration that enumerates all possible itemsets of minimum size and further eliminates itemsets with a support below a minimum support value to generate remaining itemsets;

performing a second iteration on the remaining itemsets to increment a size of the remaining itemsets and further eliminate itemsets from the incremented remaining itemsets with a support below a minimum support value;

repeating the second iteration until a stopping criteria is met resulting in generating an optimal set of itemsets indicating an optimal assortment of products; and initiate manufacturing of the two or more products, based, at least in part, on the assortment of products.

14. The non-transitory computer-readable medium of claim 11, wherein the product attributes value table comprises:
a set of the two or more products wherein each of the two or more products is identified by a product identifier and each product identifier is associated with one or more of the attribute values.

15. The non-transitory computer-readable medium of claim 14, wherein the value metrics table comprises:
a set of the two or more products wherein each of the two or more products is identified by a product identifier and each product identifier is associated with one or more of the value metrics.

16. The non-transitory computer-readable medium of claim 15, wherein each of the one or more itemsets comprises a combination of the attribute values, and generate one or more itemsets comprises:
enumerate two or more itemsets of a first size, wherein the size of the itemsets represents a number of the attribute values in the combination of attribute values;
calculate a support value for each itemset of the two or more itemsets of the first size, wherein the support value represents a frequency of occurrence of the combination of attribute values for each itemset of the two or more itemsets of the first size;
receive a minimal support value, wherein the minimal support value represents a minimum frequency of occurrence of the combination of attribute values; and
skim each of the itemsets of the two or more itemsets of the first size with the support value less than the minimal support value.

17. The non-transitory computer-readable medium of claim 16, the software when executed further configured to:
enumerate two or more itemsets of a second size, wherein the size of each of the itemsets of the two or more itemsets of the second size comprises a combination of attribute values greater than the combination of attribute values of each of the itemsets of the two or more itemsets of the first size.

* * * * *